Patented Oct. 30, 1928.

1,689,647

UNITED STATES PATENT OFFICE.

EDOUARD URBAIN, OF PARIS, FRANCE, ASSIGNOR TO URBAIN CORPORATION, A CORPORATION OF DELAWARE.

ACTIVE CARBOMINERAL PRODUCT.

No Drawing. Application filed May 5, 1926, Serial No. 106,933, and in France June 25, 1925.

In my earlier application, Ser. No. 25,707, filed April 24, 1925, I describe a carbon which is produced with the aid of phosphoric acid and which will contain more or less mineral matter, depending upon the type of vegetable material carbonized, which mineral matter will be in the form of tribasic phosphates.

Ordinarily, it has been considered that such mineral matter is a disadvantage when the carbon is to be used for gas absorption purposes, but it has now been found that carbons can be produced having very valuable characteristics which depend primarily upon such mineral matter. In many cases, it is advisable to increase the mineral content of the compound to the point where it becomes inaccurate to designate the product by the name of "carbon", for if the finished product has a mineral content ranging between 25% and 80% by weight of the entire mass, this product will be found to have different group characteristics from that of the ordinary active carbon. It will still have the ability (if properly prepared) of absorbing gases and vapors in a manner comparable to that of active carbon, but it will be found to have an unexpected property of giving up absorbed materials much more easily than the carbons which have heretofore been produced. This characteristic is particularly noticeable with vapors of high molecular weights even at only slightly elevated temperatures, whereas, if the temperature is substantially increased, this characteristic will become more pronounced.

In order to produce a product of this new type, the mineral matter to be added may be selected from a wide variety of substances, but care should be taken to select a material comprising some element or ingredient which is not rendered liquid or gaseous when heated to about 1000° C. with phosphoric acid. The most readily available material for this purpose is tricalcium phosphate as found in ordinary ground phosphate rock. This material may undergo some reaction with phosphoric acid, but the final resulting product is present in substantially the same quantity as was originally added. Examples of other types of material that may be used are barium silicate which is inert with the phosphoric acid, monocalcium phosphate which may be added in liquid form and which supplies both mineral matter and phosphoric acid, leaving a residue of tricalcium phosphate; or a basic substance may be used, such as calcium carbonate, which will combine with some of the phosphoric acid and leave a residue of tricalcium phosphate in the final product.

As has already been intimated, the amount of mineral matter added may vary within wide limits, but the marked characteristics of the carbo-mineral product become noticeable when the mineral content of the finished product reaches 25% of the total by weight, and under certain circumstances may be continued up to the amount of 80% by weight. If the mineral matter is supplied in a solid state, the ingredients should be ground very fine and thoroughly mixed together. I have been able to produce in this way a product which will have the capacity of absorbing in excess of 40%, and in some cases as much as 50% of its weight of chlorpicrin at a temperature of 20° C. in an atmosphere which was saturated at 0° centigrade with chlorpicrin vapor, and have found that if the product which had absorbed the chlorpicrin was heated to 100° C. in vacuum for one hour, that it gave up at least two-thirds of the chlorpicrin absorbed.

A product made by mixing together one part by weight of tricalcium phosphate ground as an impalpable powder, 9 parts of finely ground peat, and 8 parts by weight of phosphoric acid of 25° Bé, which was thoroughly mixed, pressed, extruded and calcined to the point where substantially all of the phosphorus-hydrogen compounds had been evolved, was found to absorb 40% of its weight of benzol from an atmosphere containing 30 grammes of benzol per cu. meter, and to give up the benzol very easily when heated. The percentage of absorption was 97% of the benzol which passed into the material during the absorption. This same carbon was likewise found to readily absorb naphthalene and would give up the naphthalene readily at 300° C.

In another instance, two parts by weight of precipitated barium silicate were used in place of the one part of tricalcium phosphate. The product had a density of .7 and was found to absorb a greater amount of benzol than the product first described, but to give up naphthalene less readily.

I have not described the details of manufacture in this application, as it is to be understood that except for the addition of the mineral matter, they are to follow the methods described in my earlier application, Ser.

No. 25,707, and application Ser. No. 98,376, filed March 29, 1926. I may point out however that after the materials have been mixed, agglomerated and dried, the calcination should be carried to relatively high temperatures. As the temperature approaches 800°, it will be found that $PH_3$ is evolved. Later an evolution of $P_2H_4$ will start and the evolution of $PH_3$ will cease, and finally after substantially all the hydrogen-phosphorus compounds have been evolved there will be an evolution of phosphorus. It is desirable to carry the heating to the point where the phosphorus is substantially all driven out, as this phosphorus (as well as the phosphorus hydrogen compounds) can be recovered and such recovery will be a material factor in reducing the cost of the operation.

It is to be understood that the examples which have been given are simply stated for the purposes of illustration and are not intended to limit the invention either in regard to the kinds or quantities of mineral or organic matter used. The process, while primarily directed to the production of gas absorbent material, may also be applied to the manufacture of products to be used for decolorizing purposes.

While reference has been made to the very noticeable distinction in the way the new carbo-mineral product gives up absorbed vapors of high molecular weight, it must not be understood that this product is intended to be used only with such substances. On the contrary, it is found that the same characteristic of readily giving up the absorbed vapor applies also in the case of the more readily volatile substances such as benzol, gasoline, acetone and the like, and that the use of this carbo-mineral product greatly simplifies the present processes of removing the substances from other less readily absorbed vapors or gases such as air, natural or artificial gas, or for example other mixtures of hydrocarbons.

In utilizing this new product, the gas mixture is passed through a layer of the carbo-mineral material and after the latter has absorbed its capacity of vapors, it is heated and the absorbed vapors driven off. It will be found that this distillation can be conducted far more easily than is the case with ordinary absorbent carbons. Steam or other gases (which may be heated if desired) may be passed through the carbo-mineral layer to aid in the distillation or vacuum may be used or both vacuum or heated gases may be employed jointly.

I claim:

1. The method of making an absorptive material which comprises mixing together carbonizable vegetable material, mineral material comprising a sufficient quantity of tri-calcium phosphate to constitute at least 25% of the weight of the finished product and phosphoric acid, agglomerating the mass, drying and calcining at a sufficient temperature to eliminate the major portion of the phosphorus, other than such phosphorus as is combined in a tri-basic phosphate.

2. A new product for absorption purposes comprising an apparently homogenous mass of vegetable material carbonized in the presence of phosphoric acid at a temperature sufficiently high to drive off substantially all the phosphorus except that combined in tri-basic phosphate, with which is intimately incorporated finely divided mineral matter comprising tri-calcium phosphate to the extent of at least 25% of the weight of the product.

EDOUARD URBAIN.